United States Patent [19]

Kawase

[11] Patent Number: 5,035,272
[45] Date of Patent: Jul. 30, 1991

[54] DEVICE FOR SEALING REFUELING OPENING

[75] Inventor: Ritsuo Kawase, Ogasa, Japan

[73] Assignee: NOK Corporation, Tokyo, Japan

[21] Appl. No.: 463,017

[22] Filed: Jan. 9, 1990

Related U.S. Application Data

[63] Continuation of Ser. No. 229,977, Aug. 9, 1988, abandoned.

[51] Int. Cl.[5] .............................................. B67D 5/04
[52] U.S. Cl. ..................................... 141/312; 285/345;
   285/379; 141/286; 277/152; 277/207 R;
   220/86.001; 220/85 F
[58] Field of Search ....................... 141/44, 45, 59-61,
   141/285, 286, 290, 301-308, 98, 392; 220/85 F,
   85 S, 85 VR, 85 VS, 86 R; 285/345, 379

[56] References Cited

U.S. PATENT DOCUMENTS

| | | | |
|---|---|---|---|
| 2,576,192 | 11/1951 | Poznik | 220/86 R |
| 2,778,390 | 1/1957 | Young, Jr. | 285/345 X |
| 3,734,149 | 5/1973 | Hansel | 141/350 |
| 3,857,589 | 12/1974 | Oostenbrink | 285/345 X |
| 3,903,942 | 9/1975 | Vest | 141/312 |
| 4,055,352 | 10/1977 | Allinquont et al. | 277/152 |
| 4,072,245 | 2/1978 | Sloan, Jr. | 285/345 X |
| 4,106,781 | 8/1978 | Benjamin et al. | 277/152 |
| 4,108,446 | 8/1978 | Lloyd | 285/345 X |
| 4,174,859 | 11/1979 | Houghton | 285/345 X |
| 4,432,395 | 2/1984 | Beune et al. | 285/345 X |
| 4,553,762 | 11/1985 | Hoelzer | 277/152 |
| 4,598,915 | 7/1986 | Gilbert | 285/345 X |
| 4,630,749 | 12/1986 | Armstrong et al. | 220/86 R |
| 4,690,414 | 9/1987 | Haaland | 285/345 X |
| 4,693,483 | 9/1987 | Valls | 285/379 X |
| 4,702,386 | 10/1987 | Boehmer et al. | 141/285 |
| 4,714,172 | 12/1987 | Morris | 220/86 R |
| 4,747,508 | 5/1988 | Sherwood | 220/86 R |
| 4,760,933 | 8/1988 | Christner et al. | 141/350 |
| 4,765,504 | 8/1988 | Sherwood et al. | 220/86 R |
| 4,770,677 | 9/1988 | Harris | 141/286 |
| 4,795,050 | 1/1989 | Smith et al. | 220/85 VR |
| 4,798,306 | 1/1989 | Giacomazzi et al. | 141/44 |
| 4,809,863 | 3/1989 | Woodcock et al. | 220/85 F |
| 4,813,453 | 3/1989 | Jenkins et al. | 220/86 R X |
| 4,816,045 | 3/1989 | Szlaga et al. | 220/85 VS X |
| 4,850,602 | 7/1989 | Goldstein et al. | 285/345 X |

FOREIGN PATENT DOCUMENTS

| | | | |
|---|---|---|---|
| 2436221 | 2/1975 | Fed. Rep. of Germany | 220/86 R |
| 3543834 | 6/1987 | Fed. Rep. of Germany | 285/379 |

Primary Examiner—Henry J. Recla
Assistant Examiner—Casey Jacyna
Attorney, Agent, or Firm—Oliff & Berridge

[57] ABSTRACT

A sealing device for use in a refueling opening is provided with an elastic seal member which seals a gap between a tubular casing provided in the refueling opening and a fueling nozzle inserted into the casing at the time of refueling. The elastic seal member is mounted inside a seal retaining member which is mounted inside the casing. The elastic seal member has a relief lip capable of closely contacting the casing to effect sealing, and a seal lip capable of closely containing the inserted fueling nozzle to effect sealing. A gap is formed around the outer periphery the seal lip, thereby allowing the seal lip to expand so that the inside diameter thereof increases in conformity with the outside diameter of the fueling nozzle as the nozzle is inserted.

4 Claims, 3 Drawing Sheets

DEVICE FOR SEALING REFUELING OPENING

This is a continuation of application Ser. No. 229,977, filed Aug. 9, 1988, now abandoned.

BACKGROUND OF THE INVENTION

This invention relates to a device for use in a refueling opening and, more particularly, to a sealing device for use in a refueling opening of a motor vehicle or the like at the time of refueling in order to prevent leakage of fuel and substances evaporating from the fuel.

In general, a refueling opening of a fuel tank is not provided with a sealing device for preventing substances evaporating from a fuel from escaping from the tank at the time of refueling. There is therefore a problem of evaporating substances being released to the atmosphere at the time of refueling, and there is a demand for a sealing device adapted to the fueling opening.

The inventor of the present invention has studied sealing devices for use in refueling openings and has found that a sealing device is required to satisfy the following conditions.

That is, it is desirable for the sealing device to closely contact the fueling nozzle at the time of refueling to prevent any fuel substances from being released to the atmosphere; to have a relief mechanism in order to prevent the pressure inside the fuel tank from increasing higher than a predetermined level in a case where the pressure inside the fuel tank excessively increases because the vapor of fuel substances is not released to the atmosphere; and to be capable of allowing the fueling nozzle to be inserted or drawn out with a constant load even if a portion in contact with the fuel substances and the vapor formed therefrom swells or shrinks.

The inventor had first developed a sealing device for use in a refueling opening, such as the one shown in FIGS. 6 to 9.

This sealing device for a refueling opening is constructed in such a manner that a seal retaining member 42 is disposed inside a casing 41 in the form of a tube disposed in a refueling opening (not shown), an elastic seal member 43 in the form of a ring being fixed to the seal retaining member 42. A nozzle guide member 45 for out-guiding a fueling nozzle 44 when the fueling nozzle 44 is inserted into the casing is also attached to the seal retaining member 42.

At the time of insertion of the fueling nozzle 44, the elastic seal member 43 effects sealing between itself and the fueling nozzle 44.

This type of sealing device for use in a refueling opening was manufactured by way of trial and was tested by experiment, and the following problems were found.

That is, influences of fuel and substances evaporating the fuel upon the swelling or shrinkage of the elastic seal member 32 appear as changes in the inside diameter $D_1$ of the elastic seal member 43 because the outer peripheral surface of a sealing portion of the elastic seal member 43 for effecting sealing with the fueling nozzle 44 is retained over its entire area by the seal retaining member 42.

It is necessary for the elastic seal member 43 to effect sealing between itself and the fueling nozzle 44 in conformity with the outside diameter of the fueling nozzle 44 which may vary in a certain range of dispersion, and the squeeze (which is determined the inside diameter $D_1$ of the elastic seal member 43 with which the fueling nozzle 44 is fastened see FIG. 7) is set in such a manner that the elastic seal member 43 can be brought into close contact with the fueling nozzle 44 even if the outside diameter thereof is minimum. As a result, the squeeze of fastening is excessively large when the nozzle diameter is maximum, and it further increases by the influence of swelling.

If the squeeze of fastening is increased in this manner, in other words, the elastic seal member 43 expands to a certain extent while the nozzle diameter is large, it is difficult to insert the fueling nozzle 44 into the elastic seal member 43. If, conversely, the nozzle diameter is minimum, there is a possibility of considerable deterioration of the sealing performance.

SUMMARY OF THE INVENTION

It is therefore an object of the present invention to provide a sealing device for use in a refueling opening which is capable of preventing any vapor formed from a fuel from being released to the atmosphere at the time of refueling.

It is another object of the present invention to provide a sealing device for use in a refueling opening which allows a fueling nozzle to be inserted into and drawn out of an elastic seal member with a constantly small load even if there is a certain dispersion of the outside diameter of the fueling nozzle and/or if the elastic seal member swells by the fuel and substances evaporating therefrom.

It is still another object of the present invention to provide a sealing device for use in a refueling opening which is capable of relieving the pressure inside the fuel tank if this pressure exceeds a predetermined level at the time of refueling.

The present invention therefore provides a sealing device for use in a refueling opening, the sealing device having: a tubular casing provided in the refueling opening; and an elastic seal member for sealing a gap between the casing and a fueling nozzle inserted into the casing at the time of refueling, the elastic seal member having a relief lip capable of closely contacting the casing to effect sealing, and a seal lip capable of closely contacting the inserted fueling nozzle to effect sealing, the seal lip being allowed to expand so that the inside diameter thereof increases in conformity with the outside diameter of the fueling nozzle as the fueling nozzle is inserted.

These and other objects, features and advantages of the invention will become clear from the following description of the preferred embodiments when the same is read in conjunction with the accompanying drawings.

BRIEF DESCRIPTION OF THE DRAWINGS

FIG. 1 is a cross-sectional view of a first embodiment illustrating a state in which a fueling nozzle is inserted into the device;

FIG. 2 is a cross-sectional view of the first embodiment, illustrating a state in which the fueling nozzle is not inserted;

FIG. 3 is a side view of the sealing device shown in FIG. 2, viewed from the right-hand side;

FIG. 6 is a cross-sectional view of the device into which a fueling nozzle is to be inserted;

FIG. 7 is a cross-sectional view of the device into which the fueling nozzle is not inserted;

FIG. 8 is a side view of the sealing device shown in FIG. 7, viewed from the right-hand side.

DESCRIPTION OF THE PREFERRED EMBODIMENTS

Figure 1:
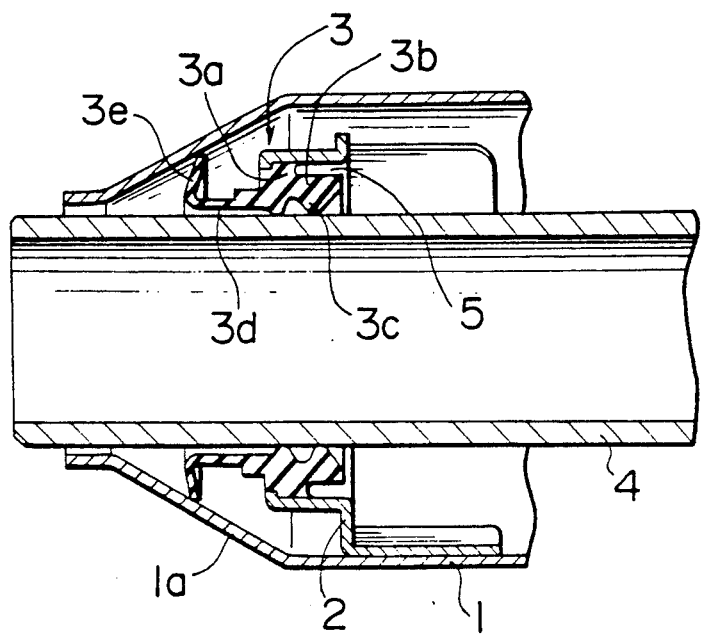
FIGS. 1 to 3 show a sealing device for use in a refueling opening which represents an embodiment of the present invention.
Figure 2:
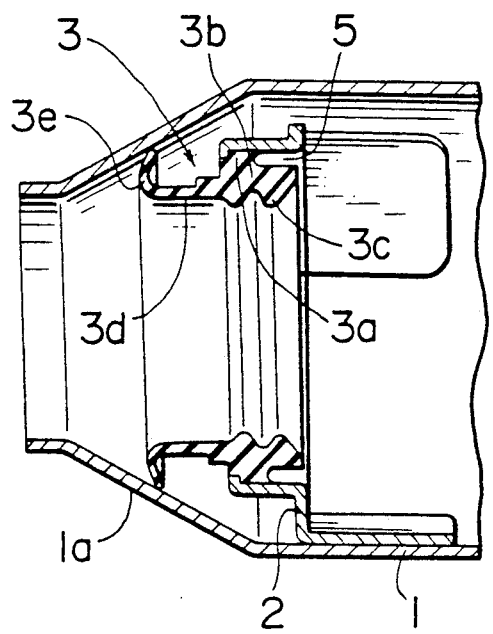
Figure 3:
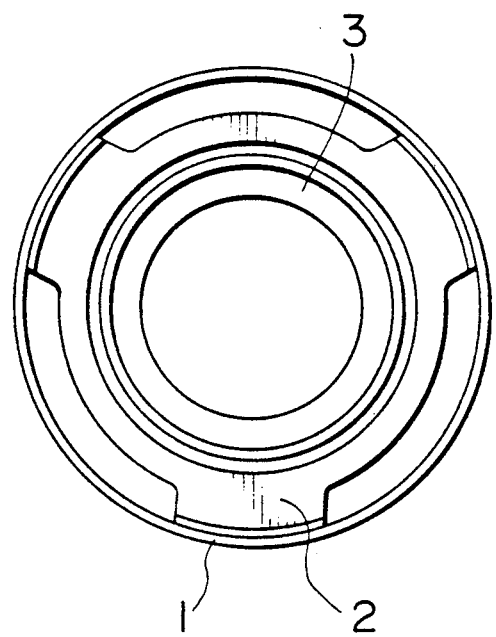

Referring to FIGS. 1 to 3, a sealing device for use in a refueling opening which represents an embodiment of the present invention has a casing 1 in the form of a tube which is disposed inside a refueling opening (not shown). The casing 1 has a slanting portion 1a formed at its inner end. A seal retaining member 2 is mounted inside the casing 1, and an elastic seal member 3 is mounted inside the seal retaining member 2.

The elastic seal member 3 is formed of an elastic body in the form of a tube made of a rubber or the like.

A fixing portion 3a in the form of a ring is formed on the outer periphery of the elastic seal member 3 integrally therewith at the center thereof. The fixing portion 3a is fixed by bonding to the inner peripheral surface of the seal retaining member 2, thereby attaching the elastic seal member 3 to the seal retaining member 2.

Two seal lip threads 3c are formed in an area of the inner peripheral surface of a seal lip 3b formed on the elastic seal member 3 at the front side relative to the direction of insertion of a fueling nozzle 4 in such a manner that they can be brought into contact with the fueling nozzle 4 when the fueling nozzle 4 is inserted into the elastic seal member 3.

A relief lip portion 3e which contacts the slanting portion 1a of the casing 1 by expanding outwardly so as to effect sealing between itself and the casing 1 is formed at the extreme end of a relief lip 3d of the elastic seal member 3 which extends in the direction of insertion of the fueling nozzle 4.

An annular gap 5 is formed between the seal lip 3b of the elastic seal member 3 and the seal retaining member 2 at the front side of the fixing portion 3a relative to the direction of insertion of the fueling nozzle 4, thereby allowing the seal lip 3b to expand in the radial direction.

The thus-constructed sealing device operates in such a manner that, as the fueling nozzle 4 is inserted into the device at the time of refueling, the seal lip threads 3c formed on the seal lip 3b are brought into close contact with the outer peripheral surface of the fueling nozzle 4, thereby positively preventing the vapor formed from fuel substances from being released to the atmosphere.

The outside diameter of the fueling nozzle 4 is greater than the inside diameter of the seal lip threads 3c of the seal lip 3b of the elastic seal member 3. Therefore, the gap 5 enables the seal lip 3b to expand in the radial direction, thereby allowing the insertion of the fueling nozzle 4. Even if the elastic seal member 3 has previously been swelled by fuel substances supplied during refueling, the operation of inserting the fueling nozzle 4 can be performed smoothly by virtue of the gap 5. In consequence, the operation of inserting or drawing out the fueling nozzle can be performed with a constantly small load.

Figure 4:
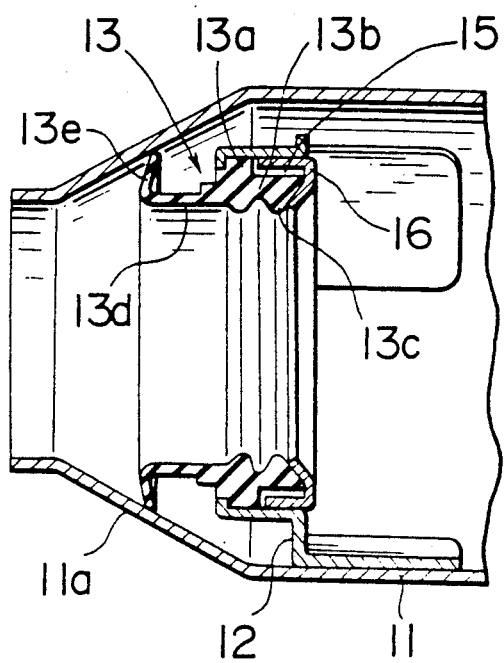
FIG. 4 is a cross-sectional view of a refueling opening sealing device which represents another embodiment of the present invention.

FIG. 4 shows a sealing device for use in a refueling opening which represents another embodiment of the present invention. This sealing device is constructed in such a manner that a nozzle guide member 16 is press-fitted into a seal retaining member 12 to a depth of a gap 15 so that the nozzle guide member 16 covers the corresponding end of the elastic seal member 13. The nozzle guide member 16 guides a fueling nozzle (not shown) when the fueling nozzle is inserted into this device. Except for this, the construction is similar to that of the sealing device shown in FIGS. 1 to 3, and portions similar to those shown in FIGS. 1 to 3 are indicated by corresponding reference characters obtained by adding 10 to each of those used in FIGS. 1 to 3.

As the fueling nozzle is inserted into the elastic seal member 13 of the thus-constructed sealing device, the top end of the fueling nozzle acts to expand the seal lip 13b of the elastic seal member 13 while being guided by the nozzle guide member 16.

At this time, the gap 15 facilitates the expansion of the seal lip 13b of the elastic seal member 13.

Since the fueling nozzle is guided by the nozzle guide member 16 when inserted, the elastic seal member 13 can be positively prevented from being damaged by the fueling nozzle.

If the internal pressure exceeds a predetermined level, any increase in the pressure higher than this level is prevented by the function of the relief lip 13e of the elastic seal member 13.

Figure 5:
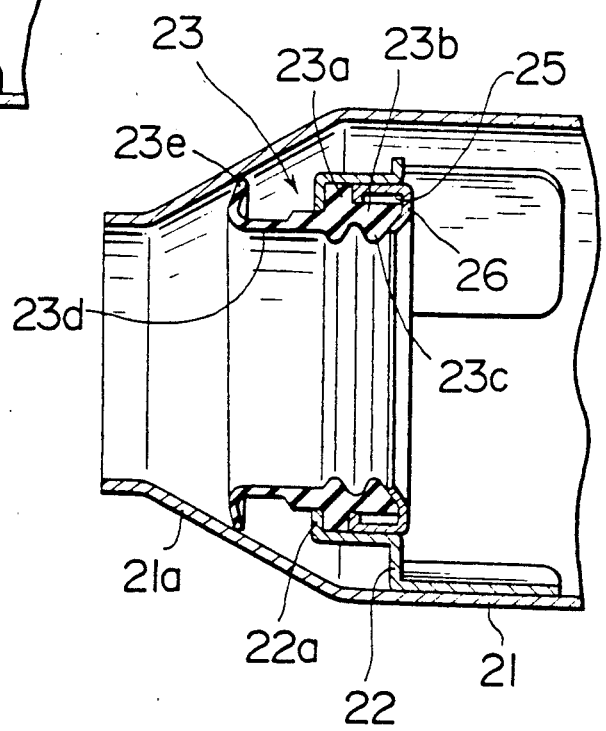
FIG. 5 is a cross-sectional view of a refueling opening sealing device which represents still another embodiment of the present invention.
Figure 6:
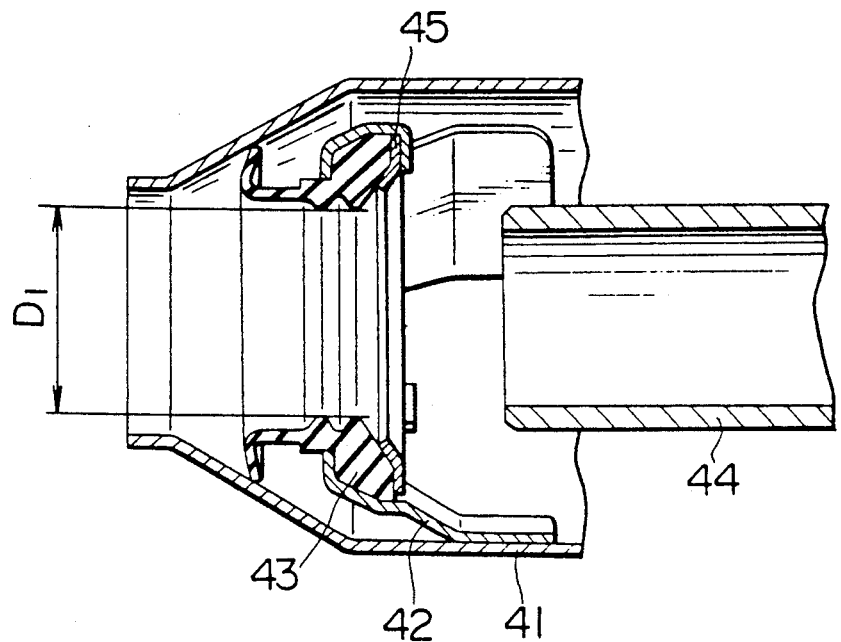
FIGS. 6 to 8 show a refueling opening sealing device which has been developed and examined during the process of attaining the present invention.
Figure 7:
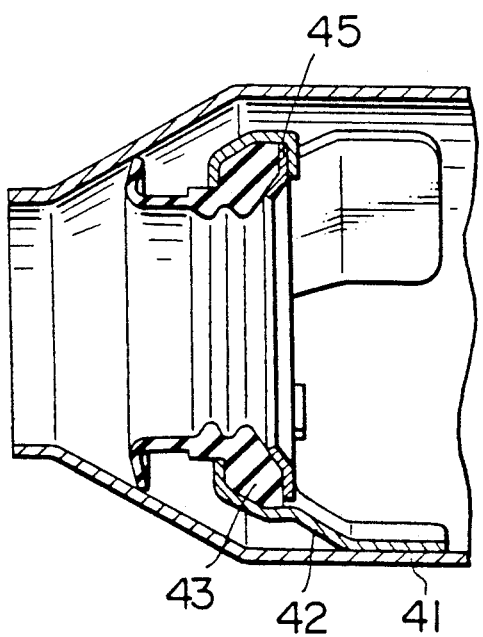
Figure 8:
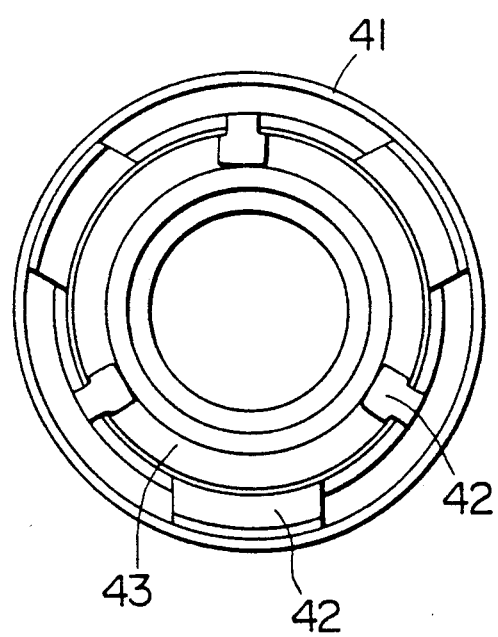

FIG. 5 shows a sealing device for use in a refueling opening which represents a still another embodiment of the present invention. This sealing device is constructed in such a manner that an end of a portion of a nozzle guide member 26 positioned inside a gap 25 presses a fixing portion 23a of an elastic seal member 23. That is, when the nozzle guide member 26 is press-fitted into the gap 25, the fixing portion 23a of the elastic seal member 23 is pinched between the end of the nozzle guide member 26 and a portion 22a of a seal retaining member 22 which is inwardly bent at right angles. Except for this, the construction is similar to that of the sealing device shown in FIG. 4, and portions similar to those shown in FIG. 4 are indicated by corresponding reference characters obtained by adding 10 to each of those used in FIG. 4.

In the thus-constructed sealing device, the elastic seal member 23 can be positively secured to the seal retaining member 22 without fixing, by bonding, the elastic seal member 23 to the seal retaining member as in the case of the sealing device shown in FIG. 4.

What is claimed is:

1. A sealing device for use in a refueling opening, comprising a casing having an inlet for receiving a refueling nozzle and inner and outer peripheral surfaces, an elastic seal member adapted to receive a fueling nozzle when refueling, said elastic seal member being impervious to fuel or vapors and providing a seal between said casing and said fueling nozzle when refueling, said elastic seal member having a retaining portion mounted in a seal retaining member which is attached to said inner surface of said casing, said elastic seal member further having a cantilevered portion extending from said retaining portion in a direction opposite to a direction of insertion of said fueling nozzle said cantilevered portion and said retaining member being arranged to define a gap therebetween, said cantilevered portion having a sealing surface and a gap facing surface on opposite sides thereof, both of said sealing surface and said gap facing surface extending along the length of said cantilevered portion, said sealing surface having at least one seal lip thread adapted to sealingly engage an inserted fueling nozzle, said elastic seal member further having a casing contacting portion extending from said retaining portion and sealingly engaging the inner surface of said casing, whereby said cantilevered annular portion is deflected outwardly when said fueling nozzle is being inserted.

2. A sealing device as recited in claim 1, further comprising a nozzle guide member mounted on said seal retaining member, said nozzle guide member covering an end of said elastic seal member so as to guide said fueling nozzle when said fueling nozzle is being inserted.

3. A sealing device according to claim 2, wherein a portion of said nozzle guide member is disposed in said gap and cooperates with said seal retaining member to fix therebetween a portion of said elastic seal member.

4. A sealing device for use in a refueling opening, comprising a casing having an inlet for receiving a refueling nozzle and inner and outer peripheral surfaces, an elastic seal member adapted to receive a fueling nozzle when refueling, said elastic seal member being impervious to fuel or vapors and providing a seal between said casing and said fueling nozzle when refueling, said elastic seal member having a retaining portion mounted in a seal retaining member which is attached to said inner surface of said casing, said elastic seal member further having a cantilevered portion extending from said retaining portion in a direction parallel to a direction of insertion of said fueling nozzle said cantilevered portion and said retaining member being arranged to define a gap therebetween, said cantilievered portion having a sealing surface and a gap facing surface on opposite sides thereof, both of said sealing surface and said gap facing surface extending along the length of said cantilevered portion, said sealing surface having at least one seal lip thread adapted to sealingly engage an inserted fueling nozzle, said elastic seal member further having a casing contacting portion extending from said retaining portion and sealingly engaging the inner surface of said casing, whereby said cantilevered annular portion is deflected outwardly when said fueling nozzle is being inserted.

* * * * *